No. 763,942. PATENTED JUNE 28, 1904.
L. P. NORMANDIN.
MACHINE FOR MOLDING BLOCKS.
APPLICATION FILED FEB. 3, 1903.
NO MODEL.
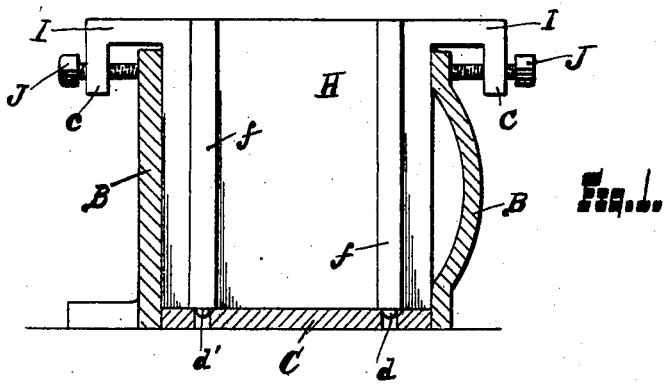
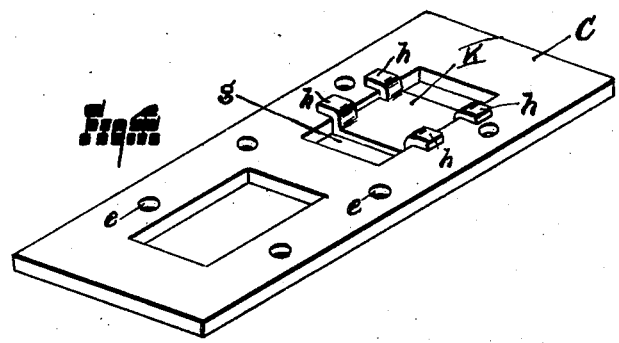
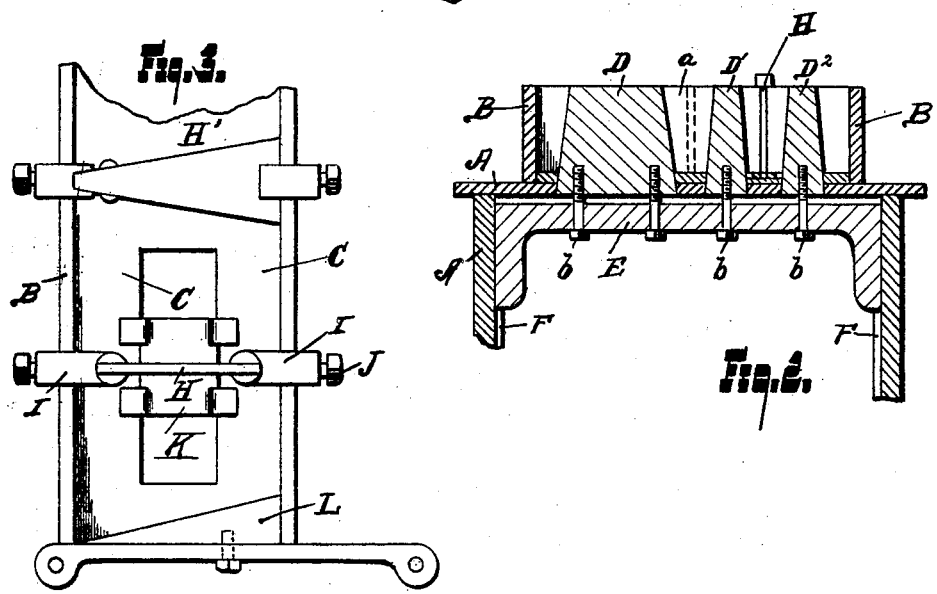
WITNESSES
INVENTOR
LEVI · P · NORMANDIN ·
By
Attorney.

No. 763,942. Patented June 28, 1904.

UNITED STATES PATENT OFFICE.

LEVI P. NORMANDIN, OF JACKSON, MICHIGAN, ASSIGNOR OF THREE-FOURTHS TO WILLIAM F. COWHAM, OF JACKSON, MICHIGAN.

MACHINE FOR MOLDING BLOCKS.

SPECIFICATION forming part of Letters Patent No. 763,942, dated June 28, 1904.

Application filed February 3, 1903. Serial No. 141,668. (No model.)

*To all whom it may concern:*

Be it known that I, LEVI P. NORMANDIN, a citizen of the United States, residing at Jackson, in the county of Jackson and State of Michigan, have invented certain new and useful improvements in Machines for Molding Blocks, of which the following is a specification, reference being had therein to the accompanying drawings.

The invention relates to a machine for the manufacture of building-blocks from cementitious compounds.

It is the object of the invention to obtain a construction in which blocks of various lengths may be formed in the same mold; and to this end the invention consists in the peculiar construction of a detachable division-plate, together with the means employed for securing it in position in the mold.

The invention further consists in the means employed for forming a hollow block of lesser length than the core used for the full-length block; further, in the means employed for forming angular blocks, and, further, in the peculiar construction, arrangement, and combination of parts, as hereinafter described and claimed.

In the drawings, Figure 1 is a vertical cross-section through the mold, showing the division-plate in elevation. Fig. 2 is a longitudinal section through the mold and its supporting-bed. Fig. 3 is a plan. Fig. 4 is a perspective view of one of the detachable bottom plates or pallets, together with an auxiliary plate used in connection therewith.

In the manufacture of building-blocks from plastic material, such as sand and cement, the plastic mixture is usually placed in a mold and subjected to more or less pressure, as by tamping. It is also usual in the formation of large blocks to provide the mold with cores, so as to produce a hollow construction. Again, to form blocks of lesser length than the full mold division-plates have been used for separating the molds into sections, and in certain prior constructions these division-plates have been supported upon the cores.

In the present construction it is desired to avoid supporting the division-plates upon the cores and to arrange them intermediate separated cores, so that each section of the resulting block will be provided with walls completely surrounding the core-aperture. It is necessary, however, to so support or hold the division-plate in position that it will not be displaced by the tamping of the plastic material and will also be capable of being withdrawn from between the still plastic molded sections of the block without injury thereto.

In the construction shown in the drawings, A designates the bed or table upon which the mold is supported. This mold comprises hinged side sections B of any suitable construction and a bottom plate or pallet C, the latter resting upon the bed and serving to support the molded block until it has sufficiently hardened to retain its shape permanently. D represents cores, which, as shown, are secured to a cross-head E, vertically slidingly secured on ways F below the table A. The cores D are adapted to project upward through apertures in the bed A and registering apertures in the plate C.

The full-sized block which is to be formed by the machine is preferably of oblong rectangular shape, and in order to give greater strength to the hollow block a plurality of separated cores are used. Thus the separated side walls of the block will be cross-connected by intermediate tie portions which are formed between the separated cores.

As shown in Fig. 2, the core D at the left-hand side of the figure is adapted to form a chamber on one side of the longitudinal figure of the block, while between this core and the adjacent core is a space $a$ for forming the tie of the block. On the right-hand end of the block a similar core may be used, if desired, but, as illustrated by Fig. 2, two smaller separated cores $D'$ and $D^2$ are used. These cores are detachably secured to the cross-head by any suitable means, such as the bolts $b$, and similar securing means is used for attaching the core D. Thus either the core D or the pair of cores $D'$ $D^2$ may be used, and the one may be quickly substituted for the other.

Where a block of full length is to be formed, two cores, such as D, are preferably used, so that in the resulting block there will be two separated chambers or hollow spaces, with an intermediate tie connection between the walls of the block. The particular number of openings is not essential, but material can be saved by making the openings as large and with as few cross connections as needed for giving the block sufficient strength.

For dividing the block into sections one or more division-plates H are provided, which are of a size to extend across between the longitudinal sides of the mold and for the full height thereof. For making a half-block this division-plate is positioned centrally within the mold and between the cores D and D', as shown on dotted line in Fig. 2. To secure the plate in position, a clamp is provided for embracing one or both of the sides of the mold. This, as shown, consists of a lug or finger I, projecting laterally from a plate H above the upper end of the mold side and having a downwardly-projecting ear $c$, through which a set-screw J passes. This set-screw has a threaded engagement with the ear and is adapted to bear against the outer face of the mold side and clamp the plate H firmly in position. To hold the lower end of the plate H from displacement, it is preferably provided with one or more downward-projecting pintles $d$, which engage with notches or apertures $e$ in the bottom plate C. If desired, the plate may be strengthened by vertically-extending ribs $f$ upon opposite sides thereof.

Where it is desired to form a quarter-block, one of the cores D is removed and the pair of cores D' D² substituted therefor. This change will leave an aperture in the bottom plate C intermediate the cores D' D² and registering with the aperture in the bed. To cover this aperture, an auxiliary plate K is provided, which, as shown in Fig. 4, is adapted to fit within the aperture $g$ in the plate C, with its upper face flush with the upper face of said plate. To hold the auxiliary plate in its position, ears or flanges $h$ are provided, which extend over the edges of the aperture $g$ and rest upon the plate C. These ears $h$ are cut away or separated from each other at the center of the plate for the purpose of permitting the division-plate H to rest upon both the plate C and the plate K. The plate is shown in this position in full lines at the right-hand side of Fig. 2, and the plate K is also shown in this figure as completely covering the opening G intermediate the cores D' D².

It is occasionally desirable to form angular blocks, with their division-faces at an angle to the front and rear faces thereof. For accomplishing this a wedge-shaped division-plate, such as H', may be used, which is provided with similar clamping means to that shown on the plate H for securing it in position. This plate will divide the mold into sections, the adjacent faces of which will incline at opposite angles to the faces formed by the parallel sides of the mold. The plate H' may be used in conjunction with other plates of the same form or in connection with parallel plates H, as shown in Fig. 3. The end plates of the mold may, if desired, be provided with wedge-shaped pieces L, secured to their inner faces and complementary in form to the plate H', so as to form a similar angling face at the end of the block.

From the description above given it will be understood that blocks of either half-length or quarter-length may be simultaneously formed within the mold, and if it were desirable the mold might be further subdivided in a similar manner. After the plastic material is placed in the mold and tamped the block is removed first by withdrawing the cores, then loosening the set-screws J, and then by withdrawing the division-plates H vertically from between the sections of the molded block. After this operation the sides B of the mold may be opened out and the bottom plate C removed from the bed A, carrying upon it the several molded sections of the block.

What I claim as my invention is—

1. The combination with a mold, comprising a bottom plate and oppositely-arranged sides, of a division-plate, a lug projecting laterally from the upper end of said division-plate beyond said side, and a set-screw in said lug adapted to bear against said side and clamp said division-plate thereto.

2. The combination with a mold, comprising a bottom plate and oppositely-arranged sides, of a division-plate extending across between said sides, means for securing said division-plate in position at its upper end, and a pintle projecting from its lower edge engaging a socket in said bottom plate.

3. A mold for building-blocks, comprising side sections, a bottom plate having an aperture therein adapted for the passage of a pair of separated cores projecting upward into said mold, and an auxiliary bottom plate for closing the opening intermediate said cores and supporting-flanges on said auxiliary plate extending over said main plate.

4. A mold for building-blocks, comprising side sections, a bottom plate having an aperture therein for the passage of a plurality of separated cores projecting upward into said mold, an auxiliary bottom plate for closing the opening intermediate said cores, and a division-plate extending across between the sides of said mold intermediate said cores and resting upon said main and auxiliary bottom plates.

5. A mold for building-blocks, comprising side sections, a bottom plate having an aperture therein for the passage of a plurality of upwardly-projecting cores, an auxiliary bottom plate for closing the opening intermediate said cores, said auxiliary plate having its upper face flush with the upper face of said main plate, separated supporting-flanges on said auxiliary plate extending over said main plate, and a division-plate extending across between said sides intermediate said cores, and said separated flanges having their lower edges bearing against the flush faces of said auxiliary and main plates.

In testimony whereof I affix my signature in presence of two witnesses.

LEVI P. NORMANDIN.

Witnesses:
KITTIE C. MORRISON,
DANIEL H. PERRY.